UNITED STATES PATENT OFFICE.

JOHN S. MacARTHUR, OF POLLOKSHIELDS, COUNTY OF RENFREW, SCOTLAND.

PROCESS OF LEACHING ORES.

SPECIFICATION forming part of Letters Patent No. 413,808, dated October 29, 1889.

Application filed September 4, 1888. Serial No. 284,582. (No specimens.)

*To all whom it may concern:*

Be it known that I, JOHN STEWART MAC-ARTHUR, a subject of the Queen of Great Britain, and Ireland, and a resident at Pollokshields, in the county of Renfrew, Scotland, have invented an Improvement in Processes of Leaching Ores, of which the following is a specification.

My invention relates to known processes for treating ores with acids—such as hydrochloric acid—or with solutions of salts having weak bases, such as solutions containing iron, manganese, or copper.

My invention is intended for the treatment of any ores containing any one or more of the metals copper, lead, zinc, silver, or gold; and my invention is more particularly applicable when the ores contain oxides or carbonates of earth metals, the presence of which causes inconvenience and waste of the agents employed in the processes as hitherto practiced.

By my invention I altogether avoid or very much diminish the inconvenience and waste referred to and the consequent expense by treating the ore with a solution of a salt which will give up its acid or a part of its acid to the oxide or carbonate. The salt to be used may be a ferrous salt or the bisulphate of an alkali. Protosulphate of iron and protochloride of iron are salts having a weak base, which are inexpensive and may be used with advantage, while bisulphate of soda and bisulphate of potash are salts of stronger bases, which may be satisfactorily used when convenient.

In practically applying my invention the quantity of the salt to be used in each case will depend on and should be at least chemically equivalent to the quantity of oxides or carbonates of the earth metals present in the ore as ascertained or estimated in any convenient way. As an example, if a carbonate of lime is present, but no other alkaline earth in a particular ore, to the extent of, say, ten pounds for every thousand of the ore, then if a solution of a bisulphate of soda be used it should contain about twelve pounds of the solid salt. For another example, if the ten pounds of earth were carbonate of magnesia, then about fourteen and one-fourth pounds of the solid bisulphate would be required.

The salt used will form with the oxides or carbonates of the earth metals either soluble compounds which may be separated by lixiviation or washing or insoluble compounds which are inert. If soda or potash is the base of the salt used, it can also be separated by lixiviation or washing. If a salt of iron is used, ferrous oxide or carbonate will be formed and will be precipitated in an insoluble condition, and if found necessary or convenient it may be separated by elutriation.

If carbonate of magnesia be present and the ore be treated with bisulphate of an alkali, a soluble compound of a sulphate of magnesia will be formed, and this may be separated by lixiviation.

I claim as my invention—

The process herein described of treating ores containing oxides or carbonates of earth metals, said process consisting in first subjecting such ores to the action of a proportionate quantity of a solution of a ferrous salt or a bisulphate of an alkali to combine with the oxides or carbonates of earth metals, and then treating the ores with an acid or salt to obtain the contained metals, all substantially as described.

In testimony whereof I have signed my name to this specification in the presence of two subscribing witnesses.

JOHN S. MacARTHUR.

Witnesses:
 EDMUND HUNT,
 DAVID FERGUSON.